(12) United States Patent
Uzkan

(10) Patent No.: US 8,943,822 B2
(45) Date of Patent: Feb. 3, 2015

(54) ENGINE SYSTEM HAVING DEDICATED AUXILIARY CONNECTION TO CYLINDER

(75) Inventor: Teoman Uzkan, Indian Head Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 123 days.

(21) Appl. No.: 13/407,242

(22) Filed: Feb. 28, 2012

(65) Prior Publication Data

US 2013/0219883 A1    Aug. 29, 2013

(51) Int. Cl.
| | |
|---|---|
| F02D 23/00 | (2006.01) |
| F01N 3/021 | (2006.01) |
| F01N 3/023 | (2006.01) |
| F01N 5/04 | (2006.01) |
| F02B 57/04 | (2006.01) |
| F02B 25/00 | (2006.01) |

(52) U.S. Cl.
USPC .............................................. 60/602; 60/280

(58) Field of Classification Search
CPC .... F02B 25/04; F02M 25/0749; F01N 3/2006
USPC .................................... 123/58.8, 315, 568.13
See application file for complete search history.

(56) References Cited

U.S. PATENT DOCUMENTS

| | | | | |
|---|---|---|---|---|
| 1,833,802 | A * | 11/1931 | Violet | 123/1 R |
| 4,131,095 | A * | 12/1978 | Ouchi | 123/58.8 |
| 4,282,845 | A | 8/1981 | Nohira et al. | |
| 4,671,226 | A | 6/1987 | van Rinsum | |
| 5,067,320 | A * | 11/1991 | Kanesaki | 60/297 |
| 5,417,068 | A * | 5/1995 | Olofsson | 60/605.1 |
| 5,517,954 | A * | 5/1996 | Melchior | 123/65 W |
| 5,870,982 | A * | 2/1999 | Strawz | 123/65 VC |
| 5,964,088 | A * | 10/1999 | Kinugasa et al. | 60/286 |
| 5,987,884 | A * | 11/1999 | Kibe et al. | 60/286 |
| 6,009,709 | A * | 1/2000 | Bailey | 60/605.2 |
| 6,185,938 | B1 * | 2/2001 | Zander et al. | 60/597 |
| 6,192,858 | B1 | 2/2001 | Nieberding | |
| 6,276,138 | B1 * | 8/2001 | Welch | 60/602 |
| 6,328,003 | B1 * | 12/2001 | Gaertner et al. | 123/58.8 |
| 6,338,244 | B1 * | 1/2002 | Guenther et al. | 60/285 |
| 6,382,193 | B1 | 5/2002 | Boyer et al. | |

(Continued)

FOREIGN PATENT DOCUMENTS

| | | |
|---|---|---|
| GB | 2009316 | 6/1979 |
| JP | 54-77828 | 6/1979 |
| JP | 63055326 A * | 3/1988 |

OTHER PUBLICATIONS

English Translation of JP 63055326A.*

Primary Examiner — Thomas Denion
Assistant Examiner — Jessica Kebea
(74) Attorney, Agent, or Firm — Finnegan, Henderson, Farabow, Garrett & Dunner LLP

(57) ABSTRACT

A system is disclosed for use with an engine. The system may have an intake manifold configured to direct air into combustion chambers of the engine. The system may also have an auxiliary device and an exhaust manifold configured to direct exhaust from the combustion chambers of the engine through the auxiliary device to the atmosphere. The system may additionally have a conduit associated with fewer than all of the combustion chambers of the engine and extending to the auxiliary device in parallel with the exhaust manifold, and an auxiliary valve disposed within the conduit and selectively movable between a flow-passing position and a flow-blocking position.

14 Claims, 2 Drawing Sheets

(56) References Cited

U.S. PATENT DOCUMENTS

| | | |
|---|---|---|
| 6,595,183 B1 * | 7/2003 | Olofsson .................. 123/315 |
| 6,722,127 B2 | 4/2004 | Scuderi et al. |
| 6,769,393 B2 | 8/2004 | Widener et al. |
| 6,925,979 B1 | 8/2005 | Seitz |
| 7,028,648 B2 | 4/2006 | Hasegawa et al. |
| 7,472,696 B2 | 1/2009 | Easley et al. |
| 7,490,462 B2 * | 2/2009 | Roozenboom et al. ......... 60/278 |
| 7,490,466 B2 * | 2/2009 | Robel et al. .................. 60/301 |
| 7,753,037 B2 * | 7/2010 | Hatamura ............... 123/568.13 |
| 7,886,530 B2 * | 2/2011 | Winsor et al. ................ 60/295 |
| 7,945,376 B2 * | 5/2011 | Geyer et al. .................. 701/108 |
| 8,490,387 B2 * | 7/2013 | Schreiber et al. ............. 60/284 |
| 2006/0010855 A1 * | 1/2006 | Kemmner et al. ............. 60/285 |
| 2007/0221166 A1 * | 9/2007 | Kemmner et al. ............ 123/324 |
| 2007/0272221 A1 | 11/2007 | Branyon et al. |
| 2008/0209889 A1 * | 9/2008 | Scheinert ........................ 60/286 |
| 2010/0011762 A1 * | 1/2010 | Hokuto et al. ................. 60/602 |
| 2010/0024399 A1 * | 2/2010 | Demura ......................... 60/285 |
| 2010/0024419 A1 | 2/2010 | Pierpont et al. |
| 2010/0077746 A1 * | 4/2010 | Gray, Jr. ........................ 60/604 |
| 2010/0192882 A1 * | 8/2010 | Kaneko ..................... 123/90.15 |
| 2011/0131978 A1 * | 6/2011 | Okada ............................ 60/602 |
| 2011/0219767 A1 * | 9/2011 | Miyashita ...................... 60/600 |

\* cited by examiner

US 8,943,822 B2

ENGINE SYSTEM HAVING DEDICATED AUXILIARY CONNECTION TO CYLINDER

TECHNICAL FIELD

The present disclosure relates generally to an engine system and, more particularly, to a system having a dedicated auxiliary connection to a cylinder of an engine.

BACKGROUND

Combustion engines such as diesel engines, gasoline engines, and gaseous fuel-powered engines are supplied with a mixture of air and fuel for combustion within the engine that generates a mechanical power output. In order to increase the power output generated by this combustion process, the engine is often equipped with a turbocharger. The turbocharger, driven by exhaust energy from the engine, forces more fresh air into combustion chambers of the engine than would otherwise be possible. This increased amount of fresh air allows for enhanced fueling that further increases the power output of the engine. Unfortunately, in some situations (e.g., during transition between low and high loads at low engine speed or during continuous operation at low speed or load), the amount of exhaust energy available to drive the turbocharger may be insufficient for the turbocharger to quickly provide a desired amount of fresh air. In these situations, a capacity, an efficiency, and/or emissions of the engine can be negatively impacted.

In addition to the goal of increasing engine power output and efficiency, it is often desirable to simultaneously reduce exhaust emissions. That is, combustion engines exhaust a complex mixture of air pollutants as byproducts of the combustion process and, due to increased attention on the environment, exhaust emission standards have become more stringent. The amount of pollutants emitted to the atmosphere from an engine can be regulated depending on the type of engine, size of engine, and/or class of engine.

One method implemented by engine manufacturers to comply with the regulation of pollutants exhausted to the environment has been to trap, reduce, convert, or otherwise remove gaseous compounds and solid particulate matter from the exhaust flow of an engine with filters and/or catalysts. These filters and catalysts, however, may only function efficiently under particular operating conditions. For example, some filters only function for a period of time, until they become saturated with particulate matter. In order for the filters to continue operation, they may need to be heated above a combustion threshold of the trapped matter such that the pollutants are burned away. Similarly, catalysts may only function efficiently when exposed to elevated temperatures.

An attempt to address one or more of the problems described above is disclosed in U.S. Pat. No. 7,028,648 issued to Hasegawa et al. on Apr. 18, 2006 (the '648 patent). In particular, the '648 patent discloses a multi-cylinder engine having a plurality of cylinders sharing a single crankshaft. The combustion characteristics in the respective cylinders are improved by taking out some of the combustion gas produced within one of the cylinders at an early stage of an expansion stroke, and then introducing the combustion gas into another of the cylinders during a suction or compression stroke. This gas sharing between cylinders is accomplished by way of a dedicated cylinder-to-cylinder conduit and associated valves.

Although the system of the '648 patent may help to improve combustion characteristics within an engine, it may still be less than optimal. In particular the system of the '648 patent may still suffer turbocharger inefficiencies during transitional situations and/or conditions that result in poor performance of exhaust treatment devices.

The disclosed engine system is directed to overcoming one or more of the problems set forth above and/or other problems of the prior art.

SUMMARY

In one aspect, the present disclosure is directed to an engine system. The engine system may include an intake manifold configured to direct air into combustion chambers of an engine. The system may also include an auxiliary device, and an exhaust manifold configured to direct exhaust from the combustion chambers of the engine through the auxiliary device to the atmosphere. The system may additionally include a conduit associated with fewer than all of the combustion chambers of the engine and extending to the auxiliary device in parallel with the exhaust manifold, and an auxiliary valve disposed within the conduit and selectively movable between a flow-passing position and a flow-blocking position.

In another aspect, the present disclosure is directed to a method of operating an engine. The method may include compressing air and directing compressed air through an intake manifold into combustion chambers of the engine. The method may also include directing exhaust from the combustion chambers through an exhaust manifold to an auxiliary device, and selectively fluidly connecting the combustion chambers of the engine with the auxiliary device via an auxiliary conduit.

DETAILED DESCRIPTION

Figure 1:
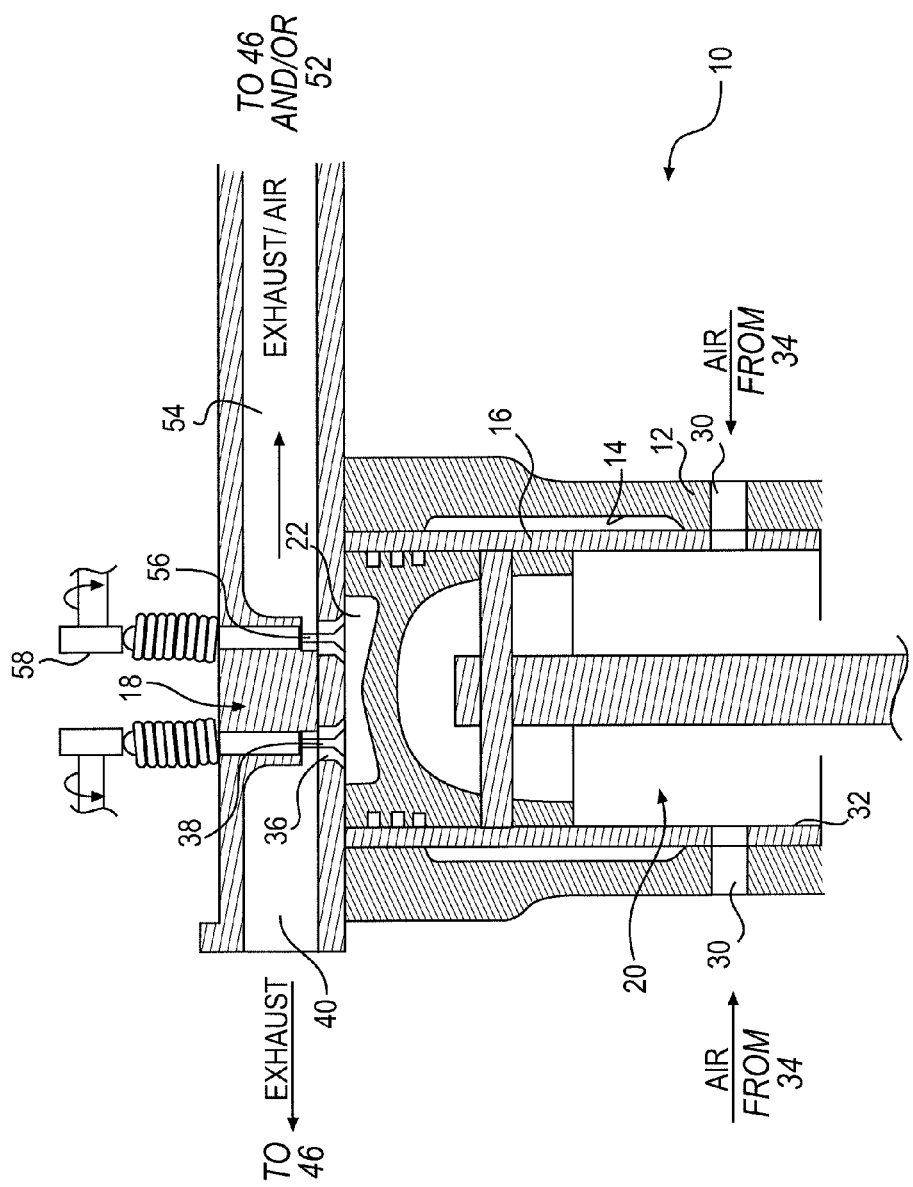
FIG. 1 is a diagrammatic illustration of an exemplary disclosed engine.

An exemplary internal combustion engine 10 is illustrated in FIG. 1. Engine 10 is depicted and described as a two-stroke diesel engine. However, it is contemplated that internal combustion engine 10 may be another type of internal combustion engine such as, for example, a four-stroke diesel engine, a two- or four-stroke gasoline engine, or a two- or four-stroke gaseous fuel-powered engine. Engine 10 may include, among other things, an engine block 12 that at least partially defines a cylinder 14, a liner 16 disposed within cylinder 14, and a cylinder head 18 connected to engine block 12 to close off an end of liner 16. A piston 20 may be slidably disposed within liner 16 and, together with liner 16 and cylinder head 18, define a combustion chamber 22. It is contemplated that engine 10 may include any number of combustion chambers 22 and that combustion chambers 22 may be disposed in an "in-line" configuration (shown in FIG. 1), in a "V" configuration, in an opposing-piston configuration, or in any other conventional configuration.

Piston 20 may be configured to reciprocate between a bottom-dead-center (BDC) or lower-most position within liner 16, and a top-dead-center (TDC) or upper-most position. In particular, piston 20 may be pivotally connected to a crankshaft (not shown) and the crankshaft may be rotatably disposed within engine block 12 so that a sliding motion of each piston 20 within liner 16 results in a rotation of the crankshaft. Similarly, a rotation of the crankshaft may result in a sliding motion of piston 20. As the crankshaft rotates through about 180 degrees, piston 20 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into combustion chamber 22 via one or more gas exchange ports (e.g., intake ports) 30 located within an annular surface 32 of liner 16. In particular, as piston 20 moves downward within liner 16, a position will eventually be reached at which intake ports 30 are no longer blocked by piston 20 and instead are fluidly communicated with combustion chamber 22. When intake ports 30 are in fluid communication with combustion chamber 22 and a pressure of air at intake ports 30 is greater than a pressure within combustion chamber 22, air will pass from an intake manifold 34 through intake ports 30 into combustion chamber 22. The timing at which intake ports 30 are opened (i.e., unblocked by piston 20 and fluidly communicated with combustion chamber 22) may have an effect on a pressure gradient between intake ports 30 and combustion chamber 22 and/or an amount of air that passes into combustion chamber 22 before intake ports 30 are subsequently closed by the ensuing upward movement of piston 20. The opening and/or closing timings of intake ports 30 may also have an effect on a temperature of the air directed into combustion chamber 22. Fuel may be mixed with the air before, during, or after the air is drawn into combustion chamber 22.

During the beginning of the intake/compression stroke described above, air may still be entering combustion chamber 22 via intake port 30 and piston 20 may be starting its upward stroke to mix the fuel and air within combustion chamber 22. Eventually, intake port 30 may be blocked by piston 20 and further upward motion of piston 20 may compress the mixture. As the mixture within combustion chamber 22 is compressed, the temperature of the mixture will increase. Eventually, the pressure and temperature of the mixture will reach a point at which the mixture combusts, resulting in a release of chemical energy in the form of temperature and pressure spikes within combustion chamber 22.

During a first phase of the power/exhaust/intake stroke, the pressure spike within combustion chamber 22 may force piston 20 downward, thereby imparting mechanical power to the crankshaft. At a particular point during this downward travel, one or more gas exchange ports (e.g., exhaust ports) 36 located within cylinder head 18 may open to allow pressurized exhaust within combustion chamber 22 to exit. In particular, as piston 20 moves downward within liner 16, a position will eventually be reached at which exhaust valves 38 move to fluidly communicate combustion chamber 22 with exhaust ports 36. When combustion chamber 22 is in fluid communication with exhaust ports 36 and a pressure of exhaust in combustion chamber 22 is greater than a pressure within exhaust ports 36, exhaust will pass from combustion chamber 22 through exhaust ports 36 into an exhaust manifold 40. The timing at which exhaust valves 38 move to open exhaust ports 36 may have an effect on a pressure gradient between combustion chamber 22 and exhaust ports 36 and/or an amount of exhaust that passes from combustion chamber 22 before exhaust ports 36 are subsequently closed by exhaust valves 38. The opening and/or closing timings of exhaust ports 36 may also have an effect on a temperature within combustion chamber 22. In the disclosed embodiment, movement of exhaust valves 38 may be cyclical and controlled by way of a cam (not shown) that is mechanically connected to the crankshaft. It is contemplated, however, that movement of exhaust valves 38 may be controlled in any other conventional manner, as desired. It is also contemplated that exhaust ports 36 could alternatively be located within cylinder liner 16 and exhaust valves 38 omitted, if desired, such as in a loop-scavenged two-cycle engine.

Figure 2:
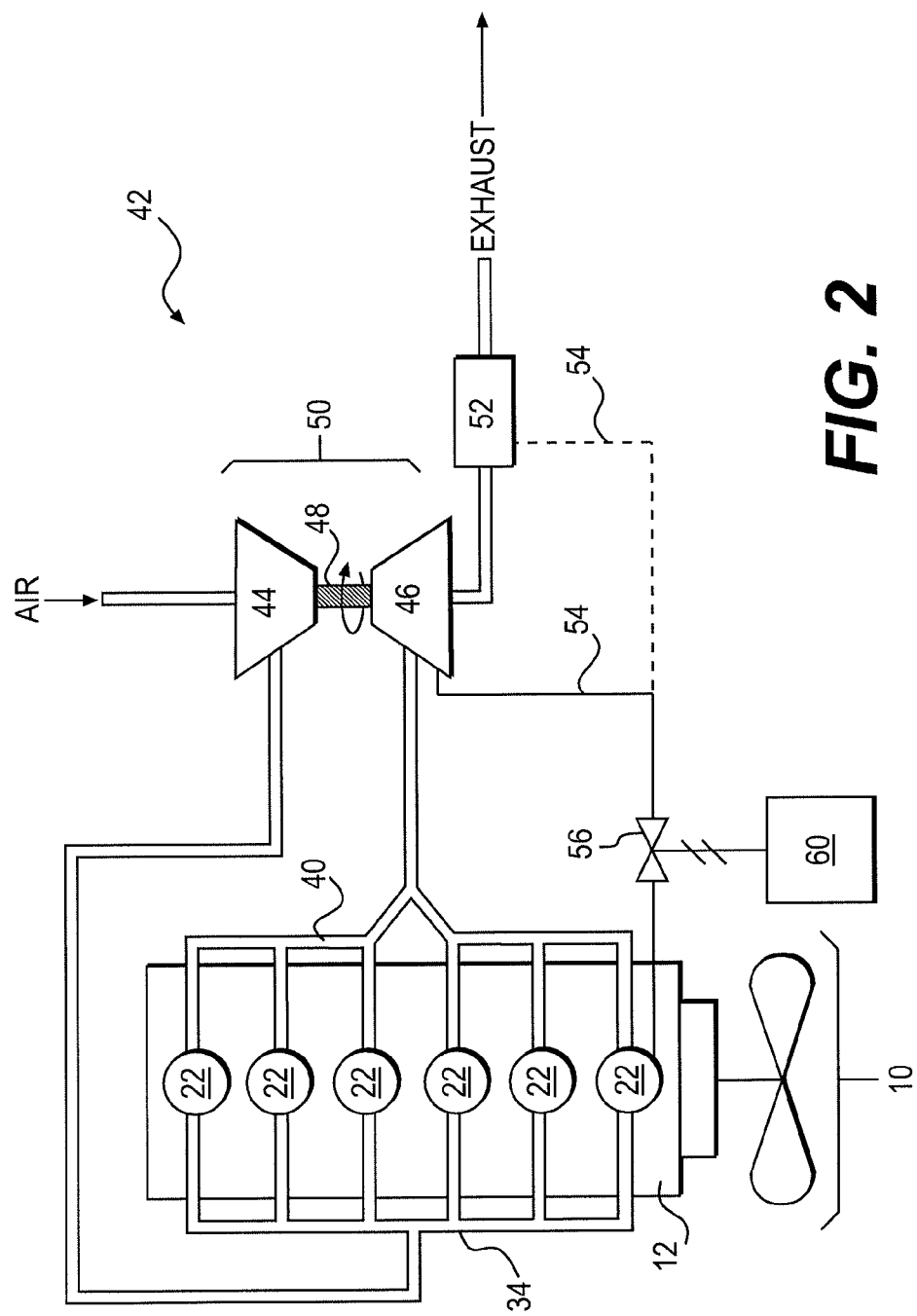
FIG. 2 is a cross-sectional illustration of an exemplary disclosed system that may be used in conjunction with the engine of FIG. 1.

As shown in FIG. 2, engine 10 may be equipped with a system 42 that controls fluid flow through engine 10. Specifically, system 42 may include components configured to introduce charged air into engine 10 and discharge exhaust to the atmosphere. For example, system 42 may include one or more air compressors 44 in fluid communication with combustion chambers 22 via intake manifold 34, and one or more turbines 46 propelled by exhaust from exhaust manifold 40 to drive compressors 44. Each compressor 44 may embody a fixed geometry compressor, a variable geometry compressor, or any other type of compressor configured to draw air from the atmosphere and compress the air to a predetermined pressure level before it enters engine 10. Turbines 46 may be directly and mechanically connected to compressors 26 by way of a shaft 48 to form a turbocharger 50. As the hot exhaust gases exiting engine 10 move through turbines 46 and expand against blades (not shown) therein, turbines 46 may rotate and drive the connected compressor 26 to pressurize inlet air.

After passing through turbines 46, the exhaust may first be treated before being released back to the atmosphere. In particular, one or more exhaust treatment devices 52 may be located to receive the exhaust from turbine 46. Exhaust treatment devices 52 may include, for example, a particulate filter, one or more catalysts, or another treatment device known in the art. Exhaust treatment devices 52 may be configured to remove, trap, reduce, or otherwise convert pollutants in the exhaust flow of engine 10 to innocuous substances.

For the purposes of this disclosure, turbocharger 50 and exhaust treatment devices 52 may be considered exemplary types of auxiliary devices that function to enhance performance of engine 10. It is contemplated, however, that other or additional types of auxiliary devices (not shown) may also or alternatively be fluidly connected to engine 10, if desired. Each of these auxiliary devices may be configured to receive fluid discharged from combustion chambers 22 via exhaust manifold 40 (or intake manifold 34) and enhance normal operations of engine 10 by increasing a fuel efficiency, increasing a power capacity, reducing emissions, reducing sound pollution, or otherwise improving one or more different performance aspects of engine 10. It is contemplated that engine 10 may be functional without these auxiliary devices, but the performance of engine 10 would be degraded.

System 42 may include an auxiliary conduit 54 that directs fluid discharged from combustion chambers 22 to an auxiliary device, for example to turbocharger 50 and/or to exhaust treatment devices 52. Auxiliary conduit 54 may be disposed in parallel with exhaust manifold 40 and be connected to fewer than all of combustion chambers 22. In the disclosed embodiment, auxiliary conduit 54 is connected to only a single combustion chamber 22. It should be noted, however, that auxiliary conduit 54 may be connected to more than one combustion chamber 22, if desired. An auxiliary valve 56 may be associated with auxiliary conduit 54 and configured to control fluid flow through auxiliary conduit 54.

Returning to FIG. 1, auxiliary valve 56 is shown as being disposed within cylinder head 18, together with exhaust valve 38. Auxiliary valve 56, in this embodiment, may be a mechanically-actuated valve caused to move between a flow-blocking position and a flow-passing position by a cam 58 that is driven by the crankshaft of engine 10. Cam 58 may be associated with only auxiliary valve 56, such that auxiliary valve 56 may be operated independently and separately from exhaust valves 38 and intake ports 30. Auxiliary valve 56 may be spring-biased toward the flow-blocking position.

FIG. 2 illustrates an alternative embodiment of auxiliary valve 56. In this embodiment, auxiliary valve 56 may be an electronically-actuated valve that is selectively caused to move to any position between the flow-blocking and flow-passing positions by a controller 60. In this embodiment, controller 60 may be capable of moving valve 56 toward the flow-passing position at any time during any stroke of piston 20 such that air, a mixture of fuel and air, and/or exhaust may be pushed from the associated combustion chamber 22 through auxiliary conduit 54 to the corresponding auxiliary device.

Controller 60 may embody a single or multiple microprocessors, field programmable gate arrays (FPGAs), digital signal processors (DSPs), etc. that include a means for controlling an operation of system 42. Numerous commercially available microprocessors can be configured to perform the functions of controller 60. It should be appreciated that controller 60 could readily embody a microprocessor separate from that controlling other non-fluid related functions, or that controller 60 could be integral with a general engine microprocessor and be capable of controlling numerous engine functions and modes of operation. If separate from a general engine microprocessor, controller 60 may communicate with the general engine microprocessor via data links or other methods. Various other known circuits may be associated with controller 60, including power supply circuitry, signal-conditioning circuitry, actuator driver circuitry (i.e., circuitry powering solenoids, motors, or piezo actuators), communication circuitry, and other appropriate circuitry.

Before, during, and/or after regulating the fluid flow through conduit 54 via valve 56, controller 60 may receive data indicative of an operational condition of engine 10 and/or an actual flow rate and constituency of fluid within conduit 54. Such data may be received from another controller or computer (not shown), from sensors strategically located throughout system 42, and/or from a user of engine 10. Controller 60 may then utilize stored algorithms, equations, subroutines, look-up maps and/or tables to analyze the operational condition data and determine a corresponding desired flow rate and/or constituency of fluid within conduit 54. Based on the desired flow rate and/or constituency, controller 60 may then cause auxiliary valve 56 to open at the right timing relative to the different strokes of piston 20 such that the desired flow rate and constituency of fluid is passed through conduit 54 to the corresponding auxiliary device.

INDUSTRIAL APPLICABILITY

The disclosed system may be applicable to any engine where a dedicated supply of fluid from the engine to an auxiliary device (e.g., a turbocharger, an exhaust treatment device, etc.) can enhance operation of the engine. The disclosed system may enhance engine operation by selectively directing a flow of air, air and fuel, and/or exhaust to the auxiliary device to trigger activation of the auxiliary device, enhance efficiency of the auxiliary device, and/or expand a capacity of the auxiliary device, without causing negative interactions with normal engine operation. Operation of system 42 will now be described with reference to FIGS. 1 and 2.

During operation of engine 10, air may be drawn from the atmosphere, pressurized by compressor 44, and directed into combustion chambers 22 by way of intake manifold 34 and intake ports 30 during the end of a downward stroke and the beginning of an upward stroke of piston 20. At any time before, during, and/or after this ingress of pressurized air, fuel may be supplied to and mixed with the air inside combustion chamber 22. Further upward movement of piston 20 may result in combustion of the fuel/air mixture and the returning downward motion of piston 20. At some point during the downward motion of piston 20, exhaust valves 38 may open to discharge exhaust from combustion chambers 22 through intake manifold to turbine 46 and/or exhaust treatment device 52.

Auxiliary valve 56 may be selectively opened at any time to allow fluid to flow from combustion chamber 22 to one or more of the auxiliary devices connected to engine 10. For example, auxiliary valve 56 may be selectively opened during the ingress of air, during the mixing of air with fuel, or during compression of the fuel/air mixture to allow fresh air and/or fuel and air to flow to a particulate filter. This air or fuel and air mixture, in the presence of elevated exhaust temperatures, may support combustion of the trapped particulate matter allowing the particulate matter to burn away and increase a capacity of the filter. Alternatively or additionally, auxiliary valve 56 may be selectively opened during combustion of the compressed fuel/air mixture within combustion chamber 22 and/or during the ensuing downward power and/or exhaust strokes of piston 20. The fluid discharged to a catalyst at this time may raise a temperature of the catalyst to within a desired activation and/or operating efficiency range. In another example, the fluid discharged during the combustion and/or exhaust strokes of piston 20 may be directed to turbine 46, thereby increasing the amount of energy imparted to turbine 46. It is contemplated that auxiliary valve 56 may alternatively or additionally be opened at other times during any of the different strokes of piston 20 such that any mixture of air, fuel, and/or exhaust may be directed to a particular auxiliary device.

Because operation of auxiliary valve 56 may be independent of operation of intake ports 30 and exhaust valves 38, the normal operations of engine 10 may be substantially unaffected thereby. In addition, because auxiliary conduit 54 may be dedicated to facilitating operation of the corresponding auxiliary device, characteristics of conduit 54 (e.g., material properties, volume, flow area, etc.) may be selected for optimum performance. Similarly, the dedicated nature of auxiliary conduit 54 may help to avoid undesired pressure and/or temperature interactions associated with intake and/or exhaust manifolds 34, 40.

It will be apparent to those skilled in the art that various modifications and variations can be made to the disclosed engine system. Other embodiments will be apparent to those skilled in the art from consideration of the specification and practice of the disclosed engine system. It is intended that the specification and examples be considered as exemplary only, with a true scope being indicated by the following claims and their equivalents.

What is claimed is:

1. An engine system, comprising:
   an intake manifold configured to direct air to mix with fuel in combustion chambers of an engine;
   an exhaust treatment device;
   a turbocharger including a compressor and a turbine;
   an exhaust manifold configured to direct exhaust from the combustion chambers of the engine through the turbine to the exhaust treatment device;
   a conduit associated with fewer than all of the combustion chambers of the engine, the conduit being configured to direct exhaust from the fewer than all of the combustion chambers to the exhaust treatment device;
   an auxiliary valve associated with the conduit and selectively movable to a flow-passing position during a portion of a compression stroke to direct air or an air/fuel mixture through the conduit and support combustion at the exhaust treatment device.

2. The engine system of claim 1, wherein the exhaust treatment device is one of a particulate filter and a catalyst.

3. The engine system of claim 1, wherein the auxiliary valve is disposed within a cylinder head of the engine.

4. The engine system of claim 3, wherein:
the engine includes exhaust valves disposed within the cylinder head; and
the auxiliary valve is operated separately from the exhaust valves.

5. The engine system of claim 4, wherein:
the engine further includes intake ports disposed within cylinder walls of the combustion chambers; and
the auxiliary valve is operated separately from the intake ports.

6. The engine system of claim 4, wherein the auxiliary valve is cam-driven and disposed within the cylinder head.

7. The engine system of claim 4, further including a controller in communication with the auxiliary valve and configured to selectively cause the auxiliary valve to move from a flow-blocking position toward the flow-passing position.

8. An engine, comprising:
an engine block at least partially defining a plurality of cylinders;
a plurality of pistons each disposed within a corresponding one of the plurality of cylinders;
a cylinder head connected to the engine block and together with the plurality of cylinders and the plurality of pistons forming a plurality of combustion chambers;
an intake manifold;
at least one intake port configured to fluidly connect the intake manifold with each of the plurality of combustion chambers;
an exhaust manifold;
at least one exhaust valve configured to fluidly connect each of the plurality of combustion chambers with the exhaust manifold;
a turbocharger including a compressor and a turbine fluidly connected to the exhaust manifold;
a particulate filter fluidly connected to the turbine;
an auxiliary conduit associated with fewer than all of the plurality of cylinders and fluidly connected to the particulate filter; and
an auxiliary valve associated with the auxiliary conduit and selectively movable to a flow-passing position to direct a fuel/air mixture to the particulate filter to initiate combustion in the particulate filter that burns away trapped particulate matter.

9. The engine of claim 8, wherein:
the at least one exhaust valve and the auxiliary valve are disposed within the cylinder head; and
the auxiliary valve is operated separately from the at least one exhaust valve.

10. The engine of claim 9, wherein:
the at least one intake port is disposed within a wall of the plurality of cylinders; and
the auxiliary valve is operated separately from the at least one intake port.

11. The engine of claim 10, further including a controller in communication with the auxiliary valve, the controller being configured to selectively cause the auxiliary valve to move from a flow-blocking position toward the flow-passing position.

12. A method of operating an engine, comprising:
compressing air;
directing compressed air through an intake manifold into combustion chambers of the engine;
mixing compressed air with fuel to form an air/fuel mixture in the combustion chambers;
combusting the air/fuel mixture to generate power and exhaust;
directing exhaust from the combustion chambers through an exhaust manifold to a turbine associated with a turbocharger;
directing the exhaust from the turbine to an exhaust treatment device; and
selectively fluidly connecting fewer than all of the combustion chambers of the engine with the exhaust treatment device via an auxiliary conduit during the mixing of compressed air with fuel.

13. The method of claim 12, wherein the exhaust treatment device is at least one of a particulate filter and a catalyst.

14. The method of claim 12, wherein:
the engine includes exhaust valves and intake ports; and
selectively fluidly connecting the combustion chambers of the engine with the exhaust treatment device includes fluidly connecting the combustion chambers of the engine with the exhaust treatment device independent of operation of the exhaust valves and intake ports.

* * * * *